United States Patent
Flosbach et al.

(10) Patent No.: US 12,227,664 B2
(45) Date of Patent: Feb. 18, 2025

(54) TOP COAT COMPOSITION

(71) Applicant: AXALTA COATING SYSTEMS IP CO., LLC, Wilmington, DE (US)

(72) Inventors: Carmen Flosbach, Wuppertal (DE); Stephen Istivan, Havertown, PA (US); Zoha al-Badri, West Grove, PA (US); Meagan Douple Goff, Philadelphia, PA (US); Katharina Dreger, Duesseldorf (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 17/446,189

(22) Filed: Aug. 27, 2021

(65) Prior Publication Data
US 2022/0064475 A1 Mar. 3, 2022

Related U.S. Application Data

(60) Provisional application No. 63/072,679, filed on Aug. 31, 2020.

(51) Int. Cl.
*C09D 133/08* (2006.01)
*B05D 1/04* (2006.01)
*B05D 3/10* (2006.01)
*C09D 133/12* (2006.01)

(52) U.S. Cl.
CPC ............. *C09D 133/08* (2013.01); *B05D 1/04* (2013.01); *B05D 3/108* (2013.01); *C09D 133/12* (2013.01)

(58) Field of Classification Search
CPC ...... C09D 133/08; C09D 133/12; B05D 1/04; B05D 3/108
USPC .......................................................... 522/182
See application file for complete search history.

(56) References Cited

U.S. PATENT DOCUMENTS

| | | | | |
|---|---|---|---|---|
| 3,821,145 A | * | 6/1974 | Walus | C09D 151/003 525/162 |
| 6,107,392 A | * | 8/2000 | Antonelli | C08F 290/04 524/556 |
| 2006/0177639 A1 | | 8/2006 | Elzen et al. | |

FOREIGN PATENT DOCUMENTS

| | | | | |
|---|---|---|---|---|
| CN | 102144008 A | | 8/2011 | |
| EP | 1138730 A2 | | 10/2001 | |
| EP | 1452572 A1 | | 9/2004 | |
| EP | 2857464 A1 | | 4/2015 | |
| KR | 2006106503 A | * | 10/2006 | ............. C08J 7/047 |
| WO | 9532228 A1 | | 11/1995 | |
| WO | WO-2010028123 A1 | * | 3/2010 | ............. C08F 2/22 |
| WO | 2014078514 A1 | | 5/2014 | |

* cited by examiner

*Primary Examiner* — Kelechi C Egwim
(74) *Attorney, Agent, or Firm* — Lorenz & Kopf, LLP

(57) ABSTRACT

Waterborne top coat compositions, processes for preparing such compositions, and methods for forming top coats on substrates are provided. In an embodiment, a waterborne top coat composition includes water, pigment(s) and resin solids. The resin solids comprise about 60 to 100 wt. % of binder solids and 0 to about 40 wt. % of crosslinker solids, the binder solids comprising about 1 to about 40 wt. % of an acrylic/(meth)acryl copolymer hybrid binder, and about 60 to about 99 wt. % of one or more additional binders, the sum of the respective wt. % in each case equaling 100 wt. %.

18 Claims, No Drawings

TOP COAT COMPOSITION

CROSS-REFERENCE TO RELATED APPLICATION

This application claims the benefit of U.S. Provisional Application No. 63/072,679, filed Aug. 31, 2020 which is hereby incorporated in its entirety by reference.

TECHNICAL FIELD

The technical field generally relates to top coat compositions for coating substrates, and more particularly relates to waterborne top coat compositions comprising an acrylic/(meth)acryl copolymer hybrid binder, and to processes for preparing such compositions and to forming the top coat layer of a base coat/top coat multi-layer coating.

BACKGROUND

Multi-layer coatings of the color- and/or special effect-imparting top coat/outer protective and gloss-imparting top coat type are state of the art in the field of automotive coating, which includes automotive refinish coating as well as automotive OEM (original equipment manufacturer) coating of vehicles and vehicle parts. It is also state of the art to apply the top coat layer of said multi-layer coatings from environmentally-friendly waterborne top coat compositions.

In certain applications, it is desirable to provide the top coat with an increased solids content. For example, a highly pigmented top coat may have an increased solids content. However, top coats having an increased solids content may have poor application characteristics. For example, top coats having an increased solids content may not exhibit an even flow out after spraying, and may result in an "orange peel" surface or sagging on a vertical surface. Specifically, a high level of solids can result in sagging of the paint layer as it dries into a coating.

There is still a need for the development of waterborne top coat compositions with increased solids content and improved stability, such as improved sag resistance. Further, there is a need for the development of waterborne top coat compositions with reduced haze. This is particularly true with regard to aqueous effect top coat compositions, especially aqueous metallic top coat compositions. Waterborne top coat compositions with a tendency towards instability often exhibit an undesired color shift over time, especially in case of aqueous OEM top coat compositions which are typically conveyed in circulating lines.

SUMMARY

Waterborne top coat compositions, processes for preparing such compositions, and methods for forming top coats on substrates are provided. In an embodiment, a waterborne top coat composition includes water, pigment(s) and resin solids. The resin solids comprise about 60 to 100 wt. % of binder solids and 0 to about 40 wt. % of crosslinker solids, the binder solids comprising about 1 to about 40 wt. % of an acrylic/(meth)acryl copolymer hybrid binder, and about 60 to about 99 wt. % of one or more additional binders, the sum of the respective wt. % in each case equaling 100 wt. %.

In another embodiment, a method for forming a top coat on a substrate is provided. The method includes spray-applying a waterborne top coat composition on the substrate to form a top coat layer. The waterborne top coat composition comprises water, pigment(s) and resin solids, with the resin solids comprising about 60 to 100 wt. % of binder solids and 0 to about 40 wt. % of crosslinker solids, and the binder solids comprising about 1 to about 40 wt. % of acrylic/(meth)acryl copolymer hybrid binder, and about 60 to about 99 wt. % of one or more additional binders, the sum of the respective wt. % in each case equaling 100 wt. %. The method further includes curing the top coat layer to form a cured top coat.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the compositions and methods as described herein. Furthermore, there is no intention to be bound by any theory presented in the preceding background or summary or in the following detailed description.

As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as being modified by the word "about" or may be understood as being not modified by the word "about". As used herein, the "%" or "percent" described in the present disclosure refers to the weight percentage unless otherwise indicated.

As noted above, a waterborne top coat composition is provided herein. The waterborne top coat composition has a resin solids comprising about 60 to 100 wt. % (weight %) of binder solids and 0 to about 40 wt. % of crosslinker solids, the binder solids comprising about 1 to about 40 wt. % of an acrylic/(meth)acryl copolymer hybrid binder, and about 60 to about 99 wt. % of one or more further binders, the sum of the respective wt. % in each case equaling 100 wt. %. The binder may have a hydroxyl number of about 30 to about 200 mg KOH/g and a carboxyl number of about 8 to about 50 mg KOH/g.

In exemplary embodiments, the acrylic/(meth)acryl copolymer hybrid binder is formed by first preparing a polymer with good emulsifying properties, then inverting it to a secondary dispersion and using as a supporting resin/surfactant for emulsion polymerization (25-80% of supporting resin). In exemplary embodiments, the supporting resin is an acrylic resin.

In an exemplary embodiment of the method, a first step includes making an acidic macromonomer by single chain technology (SCT) with methacrylic acid and MMA as comonomers.

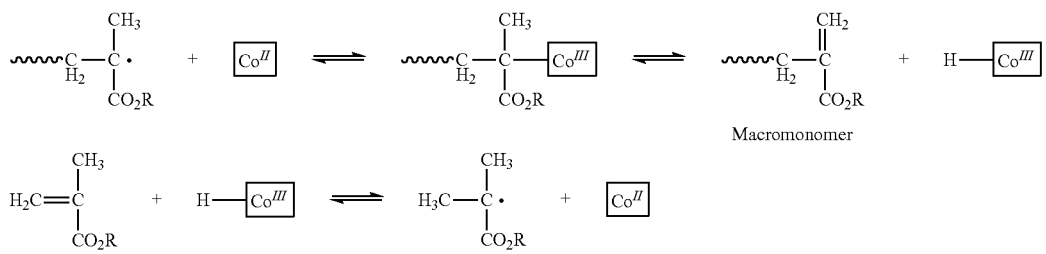

Macromonomer

In a second step of an exemplary embodiment, the macromonomers are used to make graft polymers with styrene, EHA, HPMA, HEMA, MMA:

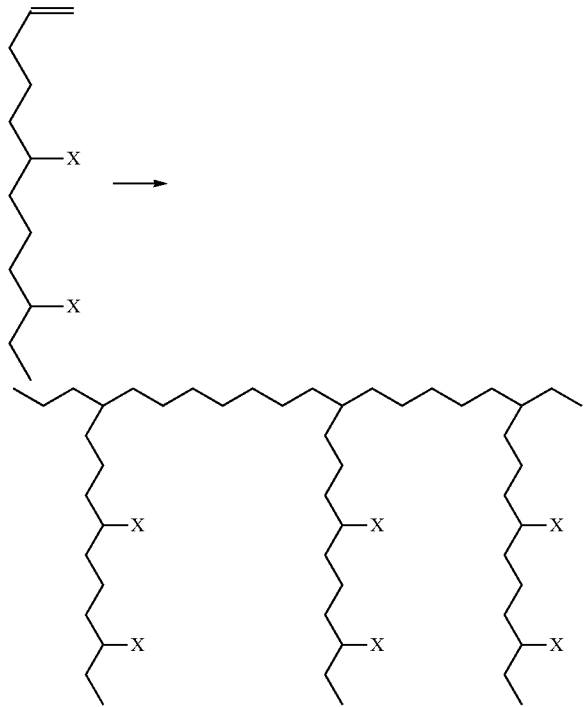

wherein X is an acid. The graft polymers are neutralized and inverted into water.

A third step of an exemplary embodiment includes emulsion polymerization of styrene, HPMA, HEMA, MMA, EHA in the presence of the supporting acrylic resin prepared in steps 1 and 2.

In certain embodiments, the (meth)acryl copolymer part of the hybrid resin is without OH-functionality. In an exemplary process, monomers are fed neat, without surfactant. In exemplary embodiments, the core may be cross-linked or not cross-linked. It is contemplated that a small amount of glycidyl methacrylate (GMA) may be used to chemically connect the core and shell by reacting with the acid functionality of the shell.

Exemplary processing is described in more detail below in relation to the Examples. As noted above, a waterborne top coat composition includes the acrylic/(meth)acryl copolymer hybrid binder.

Water

An exemplary waterborne top coat composition has a total water content of at least 0.1 wt. %, such as at least 0.5 wt. %, for example at least 1 wt. %, such as at least 1.5 wt. %, for example at least 2 wt. %, such as at least 2.5 wt. %, for example at least 5 wt. %, such as at least 10 wt. %, for example at least 15 wt. %, such as at least 20 wt. %, for example at least 25 wt. %, such as at least 30 wt. %, for example at least 35 wt. %, such as at least 40 wt. %, for example at least 45 wt. %, such as at least 50 wt. %, for example at least 55 wt. %, such as at least 60 wt. %, for example at least 65 wt. %, such as at least 70 wt. %. An exemplary waterborne top coat composition has a total water content of at most 75 wt. %, such as at most 70 wt. %, for example at most 65 wt. %, such as at most 60 wt. %, for example at most 55 wt. %, such as at most 50 wt. %, for example at most 45 wt. %, such as at most 40 wt. %, for example at most 35 wt. %, such as at most 30 wt. %, for example at most 25 wt. %

Total Solids

In exemplary embodiments, the waterborne top coat composition has a selected total solids content. The total solids content is based on the total weight of the waterborne top coat composition. An exemplary waterborne top coat composition has a total solids content of at least 30 wt. %; such as at least 35 wt. %; for example at least 36 wt. %; such as at least 37 wt. %; for example at least 38 wt. %; such as at least 39 wt. %; for example at least 40 wt. %; such as at least 41 wt. %; for example at least 42 wt. %; such as at least 43 wt. %; for example at least 44 wt. %; such as at least 45 wt. %; for example at least 46 wt. %; such as at least 47 wt. %; for example at least 48 wt. %; such as at least 49 wt. %; for example at least 50 wt. %. Further, an exemplary waterborne top coat composition has a total solids content of at most 70 wt. %, for example at most 65 wt. %; such as at most 60 wt. %; for example at most 55 wt. %; such as at most 54 wt. %; for example at most 53 wt. %; such as at most 52 wt. %; for example at most 51 wt. %; such as at most 50 wt. %; for example at most 49 wt. %; such as at most 48 wt. %; for example at most 47 wt. %; such as at most 46 wt. %; for example at most 45 wt. %; such as at most 44 wt. %; for example at most 43 wt. %; such as at most 42 wt. %; for example at most 41 wt. %; such as at most 40 wt. %.

Total Pigment Content

In exemplary embodiments, the waterborne top coat composition has a selected total pigment content, which may be formed from one or more pigments. The total pigment content is based on the total weight of the waterborne top coat composition. An exemplary waterborne top coat composition has a total pigment content of at least 1 wt. %; such as at least 2 wt. %; for example at least 3 wt. %; such as at least 4 wt. %; for example at least 5 wt. %; such as at least 6 wt. %; for example at least 7 wt. %; such as at least 8 wt. %; for example at least 9 wt. %; such as at least 10 wt. %; for example at least 11 wt. %; such as at least 12 wt. %; for example at least 13 wt. %; such as at least 14 wt. %; for example at least 15 wt. %; such as at least 16 wt. %; for example at least 17 wt. %; such as at least 18 wt. %; for example at least 19 wt. %; such as at least 20 wt. %. Further, an exemplary waterborne top coat composition has a total pigment content of at most 30 wt. %; such as at most 25 wt. %; for example at most 22 wt. %; such as at most 21 wt. %; for example at most 20 wt. %; such as at most 19 wt. %; for example at most 18 wt. %; such as at most 17 wt. %; for example at most 16 wt. %; such as at most 15 wt. %; for example at most 14 wt. %; such as at most 13 wt. %; for example at most 12 wt. %; such as at most 11 wt. %; for example at most 10 wt. %; such as at most 9 wt. %; for example at most 8 wt. %; such as at most 7 wt. %; for example at most 6 wt. %; such as at most 5 wt. %; for example at most 4 wt. %.

Resin Solids

An exemplary waterborne top coat composition has a resin solids content, based on a total weight of the waterborne top coat composition, of at least 10 wt. %, such as at least 15 wt. %; for example at least 20 wt. %; such as at least 25 wt. %; for example at least 30 wt. %; such as at least 35 wt. %. An exemplary waterborne top coat composition has a resin solids content, based on a total weight of the waterborne top coat composition, of at most 40 wt. %, such as at most 35 wt. %; for example at most 30 wt. %; such as at most 25 wt. %; for example at most 20 wt. %; such as at most 15 wt. %.

In an exemplary waterborne top coat composition, the binder solids content in the resin solids is at least 60 wt. %, such as at least 65 wt. %; for example at least 70 wt. %; such as at least 75 wt. %; for example at least 80 wt. %; such as at least 85 wt. %; for example at least 90 wt. %; such as at least 95 wt. %. In an exemplary waterborne top coat composition, the binder solids content in the resin solids is at most 100 wt. %, such as at most 95 wt. %; for example at most 90 wt. %; such as at most 85 wt. %; for example at most 80 wt. %; such as at most 75 wt. %; for example at most 70 wt. %; such as at most 65 wt. %.

In an exemplary waterborne top coat composition, the crosslinker solids content in the resin solids is at least 0 wt. %, such as at least 5 wt. %; for example at least 10 wt. %; such as at least 15 wt. %; for example at least 20 wt. %; such as at least 25 wt. %; for example at least 30 wt. %; such as at least 35 wt. %. In an exemplary waterborne top coat composition, the crosslinker solids content in the resin solids is at most 40 wt. %, such as at most 35 wt. %; for example at most 30 wt. %; such as at most 25 wt. %; for example at most 20 wt. %; such as at most 15 wt. %; for example at most 10 wt. %; such as at most 5 wt. %.

Binder Solids

In an exemplary waterborne top coat composition, the acrylic/(meth)acryl copolymer hybrid binder content in the binder solids is at least 1 wt. %; such as at least 2 wt. %; for example at least 3 wt. %; such as at least 4 wt. %; for example at least 5 wt. %; such as at least 8 wt. %; for example at least 10 wt. %; such as at least 15 wt. %; for example at least 20 wt. %; such as at least 25 wt. %; for example at least 30 wt. %; such as at least 35 wt. %. In an exemplary waterborne top coat composition, the acrylic/(meth)acryl copolymer hybrid binder content in the binder solids is at most 40 wt. %; such as at most 39 wt. %; for example at most 38 wt. %; such as at most 37 wt. %; for example at most 35 wt. %; such as at most 32 wt. %; for example at most 30 wt. %; such as at most 25 wt. %; for example at most 20 wt. %; such as at most 15 wt. %; for example at most 10 wt. %; such as at most 5 wt. %; for example at most 1 wt. %. In exemplary embodiments, one or more additional binders form the remainder of the binder solids.

Acrylic/(Meth)Acryl Copolymer Hybrid Binder

In an exemplary waterborne top coat composition, the acrylic resin part content in the acrylic/(meth)acryl copolymer hybrid binder is at least 10 wt. %; such as at least 15 wt. %; for example at least 20 wt. %; such as at least 22.5 wt. %; for example at least 25 wt. %; such as at least 27.5 wt. %; for example at least 30 wt. %; such as at least 32.5 wt. %; for example at least 35 wt. %; such as at least 37.5 wt. %; for example at least 40 wt. %; such as at least 45 wt. %; for example at least 50 wt. %; such as at least 55 wt. %; for example at least 60 wt. %; such as at least 65 wt. %; for example at least 70 wt. %; such as at least 75 wt. %. In an exemplary waterborne top coat composition, the acrylic resin part content in the acrylic/(meth)acryl copolymer hybrid binder is at most 80 wt. %; such as at most 75 wt. %; for example at most 70 wt. %; such as at most 65 wt. %; for example at most 60 wt. %; such as at most 55 wt. %; for example at most 50 wt. %; such as at most 45 wt. %; for example at most 40 wt. %; such as at most 35 wt. %; for example at most 30 wt. %. In exemplary embodiments, a (meth)acryl copolymer part forms the remainder of the acrylic/(meth)acryl copolymer hybrid binder.

In an exemplary embodiment, the acrylic/(meth)acryl copolymer hybrid binder is obtained by free-radical copolymerization of free-radically copolymerizable olefinically unsaturated monomers comprising (meth)acryl compounds in the presence of an aqueous dispersion of an acrylic resin as described below. In an exemplary embodiment, a proportion by weight of (meth)acryl compounds among the free-radically copolymerizable olefinically unsaturated monomers is in the range of about 50 to 100 wt. %, wherein the wt. % is based on a total weight of the free-radically copolymerizable olefinically unsaturated monomers.

In an embodiment, the acrylic/(meth)acryl copolymer hybrid binder can be obtained by free-radical copolymerization of free-radically copolymerizable olefinically unsaturated monomers comprising (meth)acryl compounds (compounds having one or more (meth)acryloyl groups in the molecule) in the presence of an aqueous dispersion of an acrylic resin.

It has been found that the waterborne top coat composition has an improved stability when compared with a similar waterborne top coat composition having a binder solids not comprising the about 1 to about 40 wt. % of the acrylic/(meth)acryl copolymer hybrid binder.

The term "(meth)acryl" is used herein; it shall mean acryl and/or methacryl.

In the description and the claims a distinction is made between "solids", "resin solids", "binder solids" and "crosslinker solids" of the waterborne top coat composition contemplated herein. The term "solids" means non-volatile components. For example, the solids of a color- and/or effect-imparting waterborne top coat composition are formed by its resin solids plus pigments plus optionally present fillers (extenders) plus optionally present non-volatile additives. Resin solids means binder solids plus, if present, crosslinker solids. Binder solids means the solids contribution of one or more binders. Crosslinker solids means the solids contribution of one or more crosslinkers. The solids of a volatile matter-containing coating composition or a coating intermediate like, for example, a binder solution or a binder dispersion, can be determined in accordance with DIN EN ISO 3251 (60 minutes 150° C.).

The solids of the waterborne top coat composition contemplated herein comprise any non-volatile constituents including the resin solids and any further components making a solids contribution like pigments and, if present, fillers and non-volatile additives.

The waterborne top coat composition contemplated herein has a solids content, for example, in the range of about 10 to about 50 wt. %.

The waterborne top coat composition contemplated herein comprises water, pigment(s) and resin solids. It may further comprise the following optional components: filler(s), organic solvent(s) and conventional additive(s). The waterborne top coat composition may have a ratio by weight of pigments to resin solids of, for example, at least 0.05:1 or at least 0.1:1 and at most 2.5:1 or at most 3:1.

The resin solids content of the waterborne top coat composition contemplated herein may range, for example, from about 10 to about 40 wt. %, wherein the wt. % is based on the total weight of the waterborne top coat composition. The resin solids composition of the waterborne top coat composition is about 60 to 100 wt. % binder solids plus 0 to about 40 wt. % crosslinker solids, wherein the sum of the wt. % totals 100 wt. %. Pigment paste resins which may be contained in the waterborne top coat composition are counted as binders. The binder solids of the waterborne top coat composition consists of about 1 to about 40 wt. % of the acrylic/(meth)acryl copolymer hybrid binder and about 60 to about 99 wt. % of one or more other binders, wherein the sum of the wt. % totals 100 wt. %. In a preferred embodiment, the binder solids consists of about 5 to about 25 wt. % of the acrylic/(meth)acryl copolymer hybrid binder and about 75 to about 95 wt. % of one or more other binders, the sum of the wt. % equaling 100 wt. %.

The acrylic/(meth)acryl copolymer hybrid binder may have a hydroxyl number of about 30 to about 200 mg KOH/g, preferably about 40 to about 150 mg KOH/g and a carboxyl number of about 8 to about 50 mg KOH/g, preferably about 10 to about 40 mg KOH/g. Its weight average molar mass may be, for example, about 5000 to about 10000.

The term "weight average molar mass" is used herein. It shall mean the weight average molar mass determined by gel permeation chromatography (GPC; divinylbenzene-cross-linked polystyrene as the immobile phase, tetrahydrofuran as the liquid phase, polystyrene standards).

The acrylic/(meth)acryl copolymer hybrid binder may be obtained by free-radical copolymerization of free-radically copolymerizable olefinically unsaturated monomers comprising (meth)acryl compounds in the presence of an aqueous dispersion of an acrylic resin, such as with a carboxyl number of about 50 to about 200 mg KOH/g and a polyester polyol with a hydroxyl number of about 70 to about 300 mg KOH/g.

The acrylic/(meth)acryl copolymer hybrid binder comprises an acrylic resin part and a (meth)acryl copolymer part. The acrylic resin part may make up, for example, about 25 to about 45 wt. % of the acrylic/(meth)acryl copolymer hybrid binder, while the remaining wt. % are made up by the (meth)acryl copolymer part. The weight ratio between (meth)acryl copolymer part and acrylic resin part in the acrylic/(meth)acryl copolymer hybrid binder is formed by the ratio of the total weight of the olefinically unsaturated monomers employed in the aforedescribed free-radical copolymerization reaction and the total weight of the acrylic resin within the aqueous dispersion in the presence of which the olefinically unsaturated monomers are copolymerized.

The (meth)acryl copolymer part of the acrylic/(meth)acryl copolymer hybrid binder is a (meth)acryl copolymer that can be made by free-radically copolymerizing free-radically copolymerizable olefinically unsaturated monomers comprising one or more (meth)acryl compounds in the presence of an aqueous dispersion of the aforementioned acrylic resin part of the acrylic/(meth)acryl copolymer hybrid binder.

The free-radical copolymerization of the olefinically unsaturated monomers to form the (meth)acryl copolymer part of the acrylic/(meth)acryl copolymer hybrid binder can be performed in a separate and subsequent step after the aqueous dispersion of the acrylic resin has been formed. To this end, the olefinically unsaturated monomers comprising one or more (meth)acryl compounds can be free-radically copolymerized in the presence of the aqueously dispersed acrylic resin. In other words, the acrylic/(meth)acryl copolymer hybrid binder is a product that can be made by first forming the acrylic resin, then converting the acrylic resin into an aqueous dispersion in the presence of which said olefinically unsaturated monomers comprising one or more (meth)acryl compounds can then be free-radically copolymerized. The proportion by weight of (meth)acryl compounds among the free-radically copolymerizable olefinically unsaturated monomers lies in the range of about 50 to about 100 wt. %, wherein the wt. % is based on the total weight of the free-radically copolymerizable olefinically unsaturated monomers, i.e. the free-radically copolymerizable olefinically unsaturated monomers may be free of or they may comprise up to about 50 wt. % of free-radically polymerizable olefinically unsaturated monomers having no (meth)acryloyl groups.

A person skilled in the art knows how to carry out a free-radical copolymerization of this type. The olefinically unsaturated monomers comprising one or more (meth)acryl compounds can be polymerized under conventional conditions known to the person skilled in the art. The aqueously dispersed acrylic resin may be initially introduced into the reaction vessel, heated to the reaction temperature and then the olefinically unsaturated monomers are added. The duration of the copolymerization (time taken to apportion the olefinically unsaturated monomers plus the duration of a post-polymerization phase) is, for example, about 1 to about 10 hours. The polymerization temperature in the aqueous phase is, for example, about 50 to about 95° C. The copolymerization reaction may be initiated with conventional free-radical initiators.

The olefinically unsaturated monomers may be added separately or with a time delay during the copolymerization.

The olefinically unsaturated monomers are apportioned, i.e. added into the aqueously dispersed acrylic resin initial charge, which has generally already been adjusted to the copolymerization temperature.

The olefinically unsaturated monomers may be apportioned individually, as one monomer mixture or as two or more different mixtures of only some of the monomers. It is preferred to work with a monomer mixture.

The olefinically unsaturated monomers comprise olefinically monounsaturated monomers without functional groups.

Examples of olefinically monounsaturated monomers without functional groups that can be used are (cyclo)alkyl (meth)acrylates, such as methyl (meth)acrylate, ethyl (meth)acrylate, propyl (meth)acrylate, butyl (meth)acrylate, isopropyl (meth)acrylate, isobutyl (meth)acrylate, tert-butyl (meth)acrylate, pentyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, lauryl (meth)acrylate, isobornyl (meth)acrylate, and 4-tert-butyl cyclohexyl methacrylate; monovinylaromatic compounds, such as styrene, vinyltoluenes, alpha-methylstyrene, o-, m- or p-methylstyrene, 2,5-dimethylstyrene, p-methoxystyrene, and p-tert-butylstyrene; vinyl ethers; vinyl esters, such as vinyl acetate, vinyl versatate; and non-acidic alkyl and dialkyl esters of acids like crotonic, isocrotonic, vinylacetic, itaconic, maleic, fumaric and tetrahydrophthalic acid.

The olefinically unsaturated monomers may also comprise olefinically monounsaturated, free-radically copolymerizable monomers comprising functional groups such as in particular acid groups and hydroxyl groups.

Examples of olefinically monounsaturated, free-radically copolymerizable monomers with acid groups, in particular carboxyl groups are unsaturated mono- and dicarboxylic acids and semi-esters of dicarboxylic acids, such as, for example, (meth)acrylic, itaconic, crotonic, isocrotonic, aconitic, maleic and fumaric acid, semi-esters of maleic and fumaric acid, beta-carboxyethyl (meth)acrylate, adducts of hydroxyalkyl (meth)acrylates with carboxylic anhydrides, such as, for example, phthalic acid mono-2-methacryloyloxyethyl ester, and semi-esters prepared from maleic anhydride and saturated aliphatic alcohols such as, for example, ethanol, propanol, and (iso)butanol. Preferred monomer with an acid group is (meth)acrylic acid.

Examples of olefinically monounsaturated monomers with one or more hydroxyl groups are allyl alcohol, but in particular hydroxyalkyl (meth)acrylates such as, for example, hydroxyethyl (meth)acrylate, the hydroxypropyl (meth)acrylates, the hydroxybutyl (meth)acrylates, glycerol mono(meth)acrylate, adducts of (meth)acrylic acid onto monoepoxides, such as, for example, versatic acid glycidyl ester and adducts of glycidyl (meth)acrylate onto monocarboxylic acids such as, for example, acetic acid or propionic acid. Further examples are reaction products of hydroxyl-functional monomers with caprolactone.

The acrylic/(meth)acrylic copolymer hybrid binder may be a hybrid polymer, in which the acrylic resin and the (meth)acrylic copolymer are present in the form of an interpenetrating polymer network and/or it may take the form of a graft copolymer formed by free-radical graft copolymerization of the olefinically unsaturated monomers onto either olefinically unsaturated double bonds in the acrylic resin, or free-radical sites formed by H abstraction on the backbone of the acrylic resin.

As has already been mentioned, the binder solids of the waterborne top coat composition contemplated herein comprises about 60 to about 99 wt. % of one or more other binders, i.e. binders that are different from the acrylic/(meth)acryl copolymer hybrid binder. Such other binders are anionically and/or non-ionically stabilized aqueous binders as are conventional in the art of aqueous paint and coatings; examples include polyesters, polyurethanes, (meth)acrylic copolymer resins and/or hybrid binders derived from these classes of binders. Anionic stabilization is preferably achieved by at least partially neutralized carboxyl groups in the binder, while non-ionic stabilization is preferably achieved by lateral or terminal polyethylene oxide units in the binder. Examples of such other binders comprise resins conventionally used as binders for coating compositions, such as, for example, (meth)acrylic copolymer resins, polyester resins, polyurethane resins as well as resin hybrids of two or more of said resin types. The other binders may in particular be hydroxyl-functional.

The waterborne top coat composition contemplated herein may contain one or more conventional crosslinkers in a proportion corresponding to a solids contribution of 0 to about 40 wt. % of the resin solids of the waterborne top coat composition. Examples of such crosslinkers include aminoplast resins, interesterification crosslinkers and crosslinkers with free or reversibly blocked isocyanate groups. Examples of aminoplast resins include benzoguanamine resins and, in particular, melamine resins. Examples of interesterification crosslinkers include trisalkoxycarbonylaminotriazines. Examples of crosslinkers with free or reversibly blocked isocyanate groups include the conventional free or blocked polyisocyanate crosslinkers known as crosslinkers for coating compositions.

The waterborne top coat composition comprises one or more conventional pigments, for example, special effect pigments and/or pigments selected from among white, colored and black pigments. In other words, the waterborne top coat composition may be a solid color (color independent on the observation angle) top coat composition or, preferably, an effect color (color having a color and/or lightness flop dependent on the observation angle) top coat composition comprising one or more special effect pigments, in particular, an effect color top coat composition comprising one or more metal pigments.

Examples of special effect pigments are conventional pigments which impart to a coating color flop and/or lightness flop dependent on the angle of observation, such as, non-leafing metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The waterborne top coat composition contemplated herein may also contain fillers, for example, in a total proportion of 0 to about 30 wt. %, relative to the resin solids content. The fillers do not constitute part of the pigment content of the waterborne top coat composition. Examples are barium sulfate, kaolin, talcum, silicon dioxide and layered silicates.

The special effect pigments are generally initially introduced in the form of a conventional commercial aqueous or non-aqueous paste, optionally, combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special aqueous paste resin. Grinding may be performed in conventional assemblies known to the person skilled in the art. The formulation is then completed with the remaining proportion of the aqueous binder or of the aqueous paste resin.

In addition to one or more neutralizing agents, such as, in particular, amines and/or aminoalcohols, the waterborne top coat composition may comprise conventional additives, for example, in a total proportion of about 0.1 to about 10 wt.

% active substance, wherein the percentage by weight is based on total waterborne top coat composition. Examples are antifoaming agents, wetting agents, adhesion promoters, catalysts, levelling agents, anticratering agents, rheology control agents, for example, thickeners, and light stabilizers, for example, UV absorbers and/or HALS-based compounds (HALS, hindered amine light stabilizers).

The waterborne top coat composition contemplated herein comprises water in a proportion of, for example, about 30 to about 75 wt. %, wherein the wt. % is based on the total weight of the waterborne top coat composition.

The waterborne top coat composition may comprise conventional organic solvents, for example, in a total proportion of preferably less than about 25 wt. %, particularly preferably, less than about 15 wt. %, wherein the percentage by weight is based on total waterborne top coat composition. These are conventional coating solvents, which may originate, for example, from the binder production or are added separately. Examples of such solvents are alcohols, for example, propanol, butanol, hexanol, 2-ethyl hexanol, benzyl alcohol, isodecanol; glycol ethers, for example, diethylene glycol di-C1-C6-alkyl ether, dipropylene glycol di-C1-C6-alkyl ether, ethoxypropanol, methoxypropanol, butyl glycol, butoxypropanol, butyl diglycol, hexyl glycol, methoxybutanol; glycol ether esters, for example, methoxypropyl acetate, butyl glycol acetate, butyl diglycol acetate; glycols, for example, ethylene glycol and/or propylene glycol, and the di- or trimers thereof; ketones, such as, methyl ethyl ketone, methyl isobutyl ketone, acetone, cyclohexanone, 4-hydroxy-4-methyl-2-pentanone; terpene, aromatic or aliphatic hydrocarbons, for example, toluene, xylene or linear or branched aliphatic C6-C12 hydrocarbons.

In an embodiment, the waterborne top coat composition contemplated herein comprises no N-alkyl pyrrolidone solvent.

The waterborne top coat composition can in particular be used to apply the top coat layer of a base coat/top coat multi-layer coating. Accordingly, also provided herein is a process for preparing a base coat/top coat multi-layer coating comprising the steps:

(1) providing a substrate to be provided with a base coat/top coat multi-layer coating,
(2) spray-applying the waterborne base coat composition in any of the afore disclosed embodiments on said substrate to form a base coat layer,
(3) spray-applying a top coat composition on the base coat layer to form a top coat layer, and
(4) jointly curing the base coat and the top coat layers.

The process contemplated herein that comprises steps (1) to (4) may be a refinish or an OEM base coat/top coat multi-layer coating process, in particular, an automotive refinish or an automotive OEM base coat/top coat multi-layer coating process.

In step (1) of the process a substrate is provided.

In case of a refinish base coat/top coat multi-layer coating process the substrate may be a substrate provided with an original coating to be repaired or refinished. Examples of substrates include in particular automotive substrates like automobile bodies, automobile body parts or other automotive parts.

In case of an OEM base coat/top coat multi-layer coating process the substrate is typically one made by a serial production process. In case of an automotive OEM base coat/top coat multi-layer coating process typical examples of such mass-produced substrates include automotive substrates like automobile bodies, automobile body parts and other car parts like, for example, rims.

Automotive substrates can be plastics or metal substrates or so-called mixed construction substrates comprising plastics as well as metal. As already said, the automotive substrates may be automotive bodies or automotive body parts; automotive bodies can be metal substrates or mixed construction substrates, while automotive body parts can be metal substrates, plastics substrates or mixed construction substrates. Automotive plastics substrates may be uncoated or they may have a precoating like a conductive primer layer or, as already mentioned, an original coating to be repaired. Automotive metal substrates may have a precoating like a conventional primer layer, for example, an EDC primer layer, and, optionally, also a conventional primer surfacer layer, or, as already mentioned, an original coating to be repaired.

In step (2) of the process contemplated herein the waterborne base coat composition is spray-applied on the substrate provided in step (1) to form a base coat layer thereon. The spray application may be performed by any conventional spray application method; in case of OEM coating the typical spray application method is electrostatically-assisted high speed rotary atomization and it may be carried out so as to spray-apply the waterborne base coat composition in one or more than one spray passes, each of which is performed by electrostatically-assisted high speed rotary atomization.

In an embodiment A of the process, step (2) may be followed by an additional step (2') prior to step (3) being performed. In such additional step (2') the same waterborne base coat composition like that employed in step (2) is pneumatically spray-applied to form a coating layer. The base coat layers applied in steps (2) and (2') have the same solids composition and together they form the base coat layer of the base coat/top coat multi-layer coating.

In another embodiment B of the process contemplated herein, step (2) may be followed by an additional step (2") prior to step (3) being performed. Here, the waterborne base coat composition spray-applied in step (2) comprises a free polyisocyanate crosslinker, while in said additional step (2") a waterborne base coat composition which is free of free polyisocyanate crosslinker is spray-applied to form a coating layer. The waterborne base coat composition spray-applied in additional step (2") may have the same or a different color than the waterborne base coat composition spray-applied in step (2). In other words, the waterborne base coat composition spray-applied in step (2") has the same or a different pigment composition than the waterborne base coat composition spray-applied in step (2) and it does not comprise free polyisocyanate crosslinker. The base coat layer applied in step (2) and the coating layer applied in step (2") have in any case a different overall composition, but together they form the base coat layer of the base coat/top coat multi-layer coating.

In a preferred variant of said embodiment B, the waterborne base coat composition spray-applied in step (2) has the same pigment composition like the waterborne base coat composition spray-applied in step (2") and it can be made from the latter by mixing it with the free polyisocyanate crosslinker or a preparation or solution thereof. In said preferred variant of embodiment B, the base coat layer applied in step (2) and the coating layer applied in step (2") have a different overall, but same pigment composition and together they form the base coat layer of the base coat/top coat multi-layer coating.

In still another embodiment C of the process contemplated herein, step (2) may be followed by an additional step (2''') prior to step (3) being performed. Here, a different coating composition (a coating composition other than the waterborne base coat composition employed in step (2)), in particular, another waterborne base coat composition than that employed in step (2), is spray-applied in step (2''') to form a color- and/or effect imparting coating layer which is transparent or semi-transparent. In other words, the coating layer formed in step (2''') is not visually opaque and the color of the finished multi-layer coating is determined by the color contributions of the base coat layer formed in step (2) and of the coating layer formed in step (2'''). The base coat layer applied in step (2) and the coating layer applied in step (2''') together form the base coat layer of the base coat/top coat multi-layer coating.

The base coat layer is the color- and/or special effect-imparting coating layer within the multi-layer coating produced by the process contemplated herein. In other words, the multi-layer coating produced by the process may have a solid color or an effect color.

The overall film thickness of the base coat layer, which may be comprised of two or more coating layers or sublayers, may be in the range of, for example, about 7 to about 40 μm.

The film thicknesses indicated herein for coating layers refer in each case to dry film thicknesses.

Application of the waterborne base coat composition or compositions can be followed by a drying procedure, in particular a brief flash-off phase of, for example, about 30 seconds to about 30 minutes at an air temperature of about 20 to about 100° C., after which in step (3) a top coat composition is spray-applied to form the top coat layer in a film thickness of, for example, about 20 to about 60 μm or, in an embodiment, for example, about 80 to about 150 μm.

After an optional flash-off phase, the base coat and the top coat layers are jointly cured in step (4), for example, by baking for about 15 to about 45 minutes at about 40 to about 185° C. object temperature, which depends, among others, on the substrate material.

EXAMPLES

In the following various embodiments described above are further illustrated by means of examples:
Acrylic Resins
Exemplary waterborne top coat compositions are formed from acrylic resins. Exemplary acrylic resins are disclosed in PCT Application No. WO/1995032228A1, which is hereby incorporated by reference.

Example 1a and 1b

Examples 1a and 1b illustrate the use of a Co (II) chelate in the synthesis of the following macromonomers. The chelate is $BF_2$ bridged Co (II) (1,2-diphenyl-1,2-dioxoiminoethane)$_2$ ($H_2O$)$_2$ chelate, as described in example 44B of EP 0199436.

For Example 1a, Mixture 1 (20 wt. % Methyl ethyl ketone) was heated at reflux (±80° C.) in a reaction vessel that was kept under nitrogen. Mixture 2 (30 wt. % Methyl methacrylate, 20 wt. % Methacrylic acid, and 6 wt. % Methyl ethyl ketone) was added over 4 hours. Simultaneously with the addition of Mixture 2, Mixture 3 (4 wt. % Methyl ethyl ketone, 0.006 wt. % Co II chelate, and 0.35 wt. % Vazo® 67 initiator) was added over 90 minutes followed immediately by addition of Mixture 4 (10 wt. % Methyl ethyl ketone, 0.003 wt. % Co II chelate, and 0.3 wt. % Vazo® 52 initiator). Mixture 5 (1.23 wt. % Methyl ethyl ketone) was added, for rinsing, followed by a 5 minute hold. Afterwards, Mixture 6 (0.1 wt. % Vazo® 52 initiator, 1.9 wt. % Methyl ethyl ketone, and 1 wt. % Methyl ethyl ketone (Rinse)) was added over 30 min. followed by another rinsing step and held for 60 minutes. Final thinning included 5.111 wt. % of methyl ethyl ketone. During the total process, the temperature was kept at reflux.

Example 1a results in a macromer with a solids content of 51.8 wt. %, a Gardner-Holdt viscosity of Z3, an Acid Value of 252, a Number Averaged Molecular Weight, Mn of 2300, and a Weight Averaged Molecular Weight, Mw of 4800.

For Example 1b, Mixture 1 (20 wt. % Methyl ethyl ketone) was heated at reflux (±80° C.) in a reaction vessel that was kept under nitrogen. Mixture 2 (26 wt. % Methyl methacrylate, 14 wt. % 2-Hydroxyethyl methacrylate, 10 wt. % Methacrylic acid, and 6 wt. % Methyl ethyl ketone) was added over 4 hours. Simultaneously with the addition of Mixture 2, Mixture 3 (4 wt. % Methyl ethyl ketone, 0.006 wt. % Co II chelate, and 0.35 wt. % Vazo® 67 initiator) was added over 90 minutes followed immediately by addition of Mixture 4 (10 wt. % Methyl ethyl ketone, 0.003 wt. % Co II chelate, and 0.3 wt. % Vazo® 52 initiator). Mixture 5 (1.23 wt. % Methyl ethyl ketone) was added, for rinsing, followed by a 5 minute hold. Afterwards, Mixture 6 (0.1 wt. % Vazo® 52 initiator, 1.9 wt. % Methyl ethyl ketone, and 1 wt. % Methyl ethyl ketone (Rinse)) was added over 30 min. followed by another rinsing step and held for 60 minutes. Final thinning included 5.111 wt. % of methyl ethyl ketone. During the total process, the temperature was kept at reflux.

Example 1b results in a macromer with a solids content of 50.2 wt. %, a Gardner-Holdt viscosity of I—14, an Acid Value of 143, a Number Averaged Molecular Weight, Mn of 1500, and a Weight Averaged Molecular Weight, Mw of 3000.

Example 2

Example 2 (preparation of an acrylic resin, i.e., acrylic latex copolymer, consisting, by weight, of 92.5% backbone made from styrene/n-butyl methacrylate/butyl acrylate/2-hydroxyethyl acrylate (in the weight ratio 20/43.5/7/22) and 7.5% macromonomer (from Example 2a) made from methyl methacrylate/methacrylic acid (in the weight ratio 4.5/3).

TABLE 1

Preparation of the graft acrylic copolymer of Example 2 as formed in solution before dispersion in water as follows.

| | Parts by Weight |
|---|---|
| Part 1 | |
| n-Butylglycolether | 11.2 |
| n-Butyl diethyleneglycol ether | 3.7 |
| Macromonomer of Example 1a | 11.25 |
| Part 2 | |
| Styrene | 15.0 |
| n-Butyl methacrylate | 32.63 |
| n-Butyl acrylate | 5.25 |
| 2-Hydroxyethyl acrylate | 16.50 |
| t-Butylperacetate | 3.0 |
| n-Butylglycolether | 3.0 |
| Isopropyl alcohol | 0.3 |
| Part 3 | |
| n-Butylglycolether | 1 |

TABLE 1-continued

Preparation of the graft acrylic copolymer
of Example 2 as formed in solution
before dispersion in water as follows.

| | Parts by Weight |
|---|---|
| Part 4 | |
| t-Butylperacetate | 0.3 |
| n-Butylglycolether | 1.7 |
| Part 5 | |
| n-Butylglycolether | 1.0 |
| Total | 105.83 |
| | −105.83 |
| Yield | 100.00 |

Part 1 was heated and low boiling solvent stripped off until a reflux of 137-139° C. was obtained. Part 2 was then added over 3 hours at a reflux of 137-139° C. Part 3 was used for rinsing and Part 4 then added over 30 min. Again, the reactor inlet was rinsed and the contents held at reflux for 30 minutes. Finally, 5.83 parts were stripped off. The reactor contents were then cooled to 60-70° C. and neutralized with dimethyethanolamine in the amount of 2.30 parts. The graft copolymer was dispersed in deionized water in the amount of 85.20 parts and the pH adjusted to 85.20 (total 187.5 parts). The graft copolymer product exhibited the following characteristics: Solids 35.6%; Viscosity=10.000 cps; pH 9; AN 23.6; MN 6400; MW 18000; and Particle Size 70 nm.

Example 3

Example 3 illustrates the preparation of an acrylic-acrylic hybrid, i.e., an acrylic/(meth)acryl copolymer hybrid binder.

TABLE 2

Monomer solution utilized in the
preparation of the acrylic/(meth)acryl
copolymer hybrid binder of Example 3.

| Component | Monomer feed (grams) |
|---|---|
| Tert-butyl acrylate | 123.59 |
| n-Butylacrylate | 228.17 |
| Methyl methacrylate | 69.78 |

In Example 3, a five-liter reactor fitted with a condenser, mechanical stirrer and thermometer was filled with 316.36 grams of deionized water and 590.68 grams of self-stabilized acrylic latex copolymer prepared according to Example 2. The reaction mixture was heated to 75° C. While stirring at 75° C., a solution of 3.04 grams of 2,2'-azobis[2-methyl-N-(2-hydroxyethyl)propionamide] (Fujifilm Wako Pure Chemical Corporation) in 118.37 grams of deionized water was added to the reactor over 60 minutes at 75° C. After the initiator dosing was complete, the reaction temperature was raised to 84° C. and a monomer solution (Table 2) was then fed to the reactor at 84° C. over 120 minutes. After the dosing of monomers solution was complete, the reaction was held at 84° C. for another 120 minutes. The reactor was then cooled to ambient temperature and the product was the filtered over 80 μm mesh.

A waterborne top coat composition including the acrylic/(meth)acryl copolymer hybrid binder may provide a improvement in haze reduction as well as an improvement in gloss, and may have improved (lower) variance of longwave and shortwave signal amplitude.

As compared to conventional top coat compositions, a top coat composition formed with the above-described solids content and binder solids comprising from about 1 to about 40 wt. % of the described acrylic/(meth)acryl copolymer hybrid binder may exhibit a reduction in haze and a reduction in sagging upon application to a surface or article, such as an automotive body part.

It is noted that the top coat compositions described herein as suitable as the top coat in a multi-layer coating. Therefore, the top coat compositions are designed to form a top coat layer having desired characteristics. An exemplary method for forming a top coat on a substrate includes spray-applying a waterborne top coat composition on the substrate to form a top coat layer; and curing the top coat layer to form a cured top coat. The method may include providing an automotive body or an automotive part as the substrate. Further, in the method spray-applying may be performed by electrostatically-assisted high speed rotary atomization. In the method, spray-applying the waterborne top coat composition may include spray-applying the waterborne top coat composition such that the cured top coat has a dry thickness of from about 7 to about 40 μm. In the method, curing may include subjecting the top coat layer to a temperature of from about 40 to about 185° C. for from about 15 to about 45 minutes.

No additional layer is applied and cured over the top coat. Thus, the method may consist of forming a base coat or base coats and the top coat without forming any additional coat over of the top coat. Thus, the top coat does not undergo any additional curing steps to cure overlying layers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A waterborne top coat composition comprising:
   30-70 wt. % water;
   1-30 wt. % pigment(s); and
   10-40 wt. % resin solids;
   wherein the resin solids comprise from about 60 to 100 wt. % of binder solids and from 0 to about 40 wt. % of crosslinker solids;
   wherein the binder solids comprise from about 5 to about 25 wt. % of an acrylic/(meth)acryl copolymer hybrid binder obtained by free-radical copolymerization of tert-butyl acrylate, n-butylacrylate, and methyl methacrylate to form an acrylic resin, inverting the acrylic resin to a secondary dispersion, and performing an emulsion polymerization process with the secondary dispersion in water and from about 75 to about 95 wt. % of one or more additional binders, the sum of the respective wt. % in each case equaling 100 wt. %,
   wherein the (meth)acryl copolymer part of the acrylic/(meth)acryl copolymer hybrid binder is without OH-functionality;

wherein the acrylic/(meth)acryl copolymer hybrid binder comprises about 25 to about 80 wt. % of the acrylic resin, and wherein the waterborne top coat composition has a total solids content of at least 30 wt. %, based on a total weight of the waterborne top coat composition.

2. The waterborne top coat composition of claim 1, wherein the waterborne top coat composition has a total solids content of from about 40 to about 50 wt. %, based on a total weight of the waterborne top coat composition.

3. The waterborne top coat composition of claim 1, wherein the acrylic/(meth)acryl copolymer hybrid binder has a hydroxyl number of 30 to 200 mg KOH/g.

4. The waterborne top coat composition of claim 1, wherein the acrylic/(meth)acryl copolymer hybrid binder has a hydroxyl number of 40 to 150 mg KOH/g.

5. The waterborne top coat composition of claim 1, further comprising special effect pigments.

6. The waterborne top coat composition of claim 1, further comprising metal pigments.

7. A method for forming a top coat on a substrate, the method comprising:

spray-applying the waterborne top coat composition of claim 1 on the substrate to form a top coat layer; and curing the top coat layer to form a cured top coat.

8. The method of claim 7, further comprising providing an automotive body or an automotive part as the substrate.

9. The method of claim 7, wherein spray-applying is performed by electrostatically-assisted high speed rotary atomization.

10. The method of claim 7, wherein spray-applying the waterborne top coat composition comprises spray-applying the waterborne top coat composition such that the cured top coat has a dry thickness of from about 7 to about 40 μm.

11. The method of claim 7, wherein curing comprises subjecting the top coat layer to a temperature of from about 40 to about 185° C. for from about 15 to about 45 minutes.

12. The method of claim 7, wherein spray-applying the waterborne top coat composition comprises spray-applying the waterborne top coat composition of which the acrylic/(meth)acryl copolymer hybrid binder is obtained by free-radical copolymerization of free-radically copolymerizable olefinically unsaturated monomers comprising (meth)acryl compounds in the presence of an aqueous dispersion of an acrylic.

13. The waterborne top coat composition of claim 1, wherein the acrylic/(meth)acryl copolymer hybrid binder has a carboxyl number of 8 to 50 mg KOH/g.

14. The waterborne top coat composition of claim 1, wherein the acrylic/(meth)acryl copolymer hybrid binder has a carboxyl number of 10 to 40 mg KOH/g.

15. The waterborne top coat composition of claim 1, wherein the acrylic/(meth)acryl copolymer hybrid binder has a hydroxyl number of 30 to 200 mg KOH/g and has a carboxyl number of 8 to 50 mg KOH/g.

16. The waterborne top coat composition of claim 1, wherein the acrylic/(meth)acryl copolymer hybrid binder has a hydroxyl number of 40 to 150 mg KOH/g and has a carboxyl number of 10 to 40 mg KOH/g.

17. The waterborne top coat composition of claim 1, wherein the acrylic/(meth)acryl copolymer hybrid binder has a hydroxyl number of 40 to 150 mg KOH/g and has a carboxyl number of 10 to 40 mg KOH/g, and wherein the acrylic/(meth)acryl copolymer hybrid binder has a weight average molar mass of 5000 to 10000.

18. The waterborne top coat composition of claim 1, wherein the acrylic/(meth)acryl copolymer hybrid binder has a weight average molar mass of 5000 to 10000.

* * * * *